US011945009B2

(12) United States Patent
Chang

(10) Patent No.: US 11,945,009 B2
(45) Date of Patent: Apr. 2, 2024

(54) WET LASER CLEANING APPARATUS

(71) Applicant: Unice E-O Services Inc., Taoyuan (TW)

(72) Inventor: Chih-Nien Chang, Taoyuan (TW)

(73) Assignee: UNICE E-O SERVICES INC., Taoyuan (TW)

( * ) Notice: Subject to any disclaimer, the term of this patent is extended or adjusted under 35 U.S.C. 154(b) by 352 days.

(21) Appl. No.: 17/505,296

(22) Filed: Oct. 19, 2021

(65) Prior Publication Data

US 2023/0119554 A1   Apr. 20, 2023

(51) Int. Cl.
*B08B 7/00* (2006.01)
*B08B 3/04* (2006.01)
*B23K 26/064* (2014.01)
*B23K 26/12* (2014.01)

(52) U.S. Cl.
CPC .............. *B08B 7/0042* (2013.01); *B08B 3/04* (2013.01); *B23K 26/064* (2015.10); *B23K 26/127* (2013.01)

(58) Field of Classification Search
None
See application file for complete search history.

(56) References Cited

FOREIGN PATENT DOCUMENTS

JP     3234389 U  * 10/2021  .............. B23K 26/36

OTHER PUBLICATIONS

English Machine Translation of JP3234389U.*

* cited by examiner

*Primary Examiner* — Natasha N Campbell
*Assistant Examiner* — Pradhuman Parihar
(74) *Attorney, Agent, or Firm* — Bradley J. Thorson; DeWitt LLP

(57) ABSTRACT

A wet laser cleaning apparatus includes a machine base, a laser cleaning module, a shielding housing and a filtering device. A base material is placed in a reservoir of the machine base, into which a liquid is introduced through the filtering device. A control module drives first parallel axial track groups, a second parallel axial track group and a vertical axial track group to move an optical fiber laser knife device of the laser cleaning module to irradiate and clean the base material. A height sensor device and an orientation sensor device sense a position and a height of an object, so that the optical fiber laser knife device can automatically focus on the base material. Dusts produced after the optical fiber laser knife device has irradiated the base material are stored in the liquid, and the filtering device filters the dusts from the liquid.

11 Claims, 6 Drawing Sheets

WET LASER CLEANING APPARATUS

BACKGROUND OF THE INVENTION

(1) Field of the Invention

This invention relates to a wet laser cleaning apparatus, and more particularly to a structure of a cleaning apparatus of cleaning a base material by a laser beam and liquid immersion.

(2) Description of the Prior Art

Using laser to clean pollutants accumulated or contaminated onto a surface of a special base material (or metal material) is widely used. At present, the most frequently used method is to use a robot arm to hold a laser source, and the robot arm moves the laser source to clean the base material. However, the moving height and speed of the robot arm are restricted, and cannot achieve the optimum cleaning effect to the base material having the higher height or even cannot perform the cleaning. In addition, the currently widely used laser source is a semiconductor pump solid laser source, which cannot automatically focus, and needs replacement and calibration of components, including a laser resonant cavity, after being used for a period of time. The replacement processes are tedious and complicated. Furthermore, because toxic substances, heavy metal dusts and sparks are concurrently produced when the laser cleaning is performed, the currently applied laser cleaning apparatuses cannot collect the produced dusts in an effective and concentrated manner and cannot avoid the sparks, so that the operators are exposed to the dangerous working environment for a long time. So, how to improve the above-mentioned drawback and problem is the technical difficulty that the inventor of this case wants to solve.

SUMMARY OF THE INVENTION

A main objective of this invention is to provide a wet laser cleaning apparatus including a machine base, a laser cleaning module, a shielding housing and a filtering device. A base material is mainly placed in a reservoir of the machine base, and a liquid is introduced into the reservoir through the filtering device. Meanwhile, a control module drives first parallel axial track groups, a second parallel axial track group and a vertical axial track group to move an optical fiber laser knife device of the laser cleaning module, and the optical fiber laser knife device irradiates a surface of the base material to achieve an objective of cleaning the base material. Meanwhile, a height sensor device of the laser cleaning module and an orientation sensor device of the shielding housing are used to sense a position and a height of a to-be-cleaned object, so that the optical fiber laser knife device can automatically focus on the base material to optimize a cleaning effect. Dusts produced after the optical fiber laser knife device has irradiated the base material are stored in the liquid in the reservoir, and the filtering device filters the dusts from the liquid.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
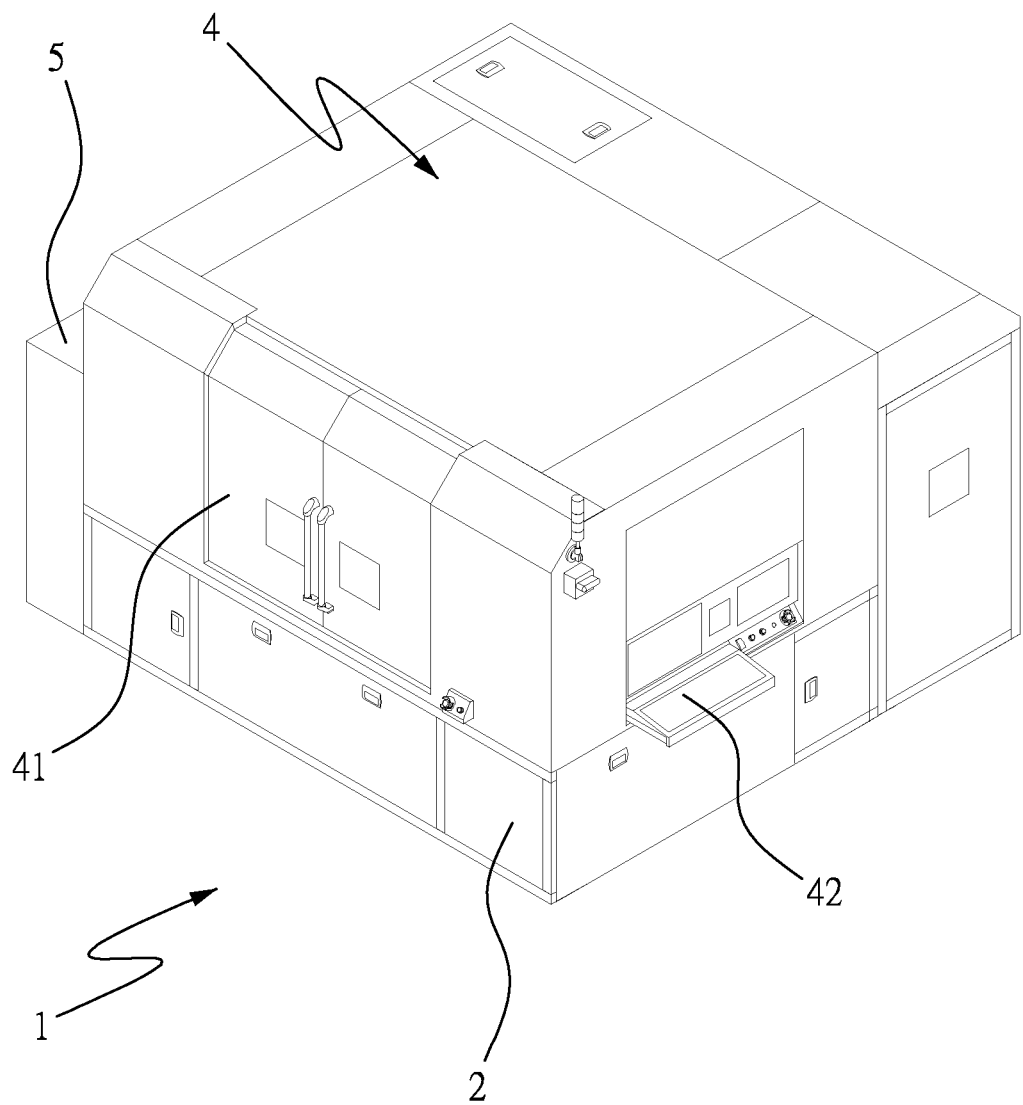
FIG. 1 is a pictorial outlook view showing this invention.
Figure 2:
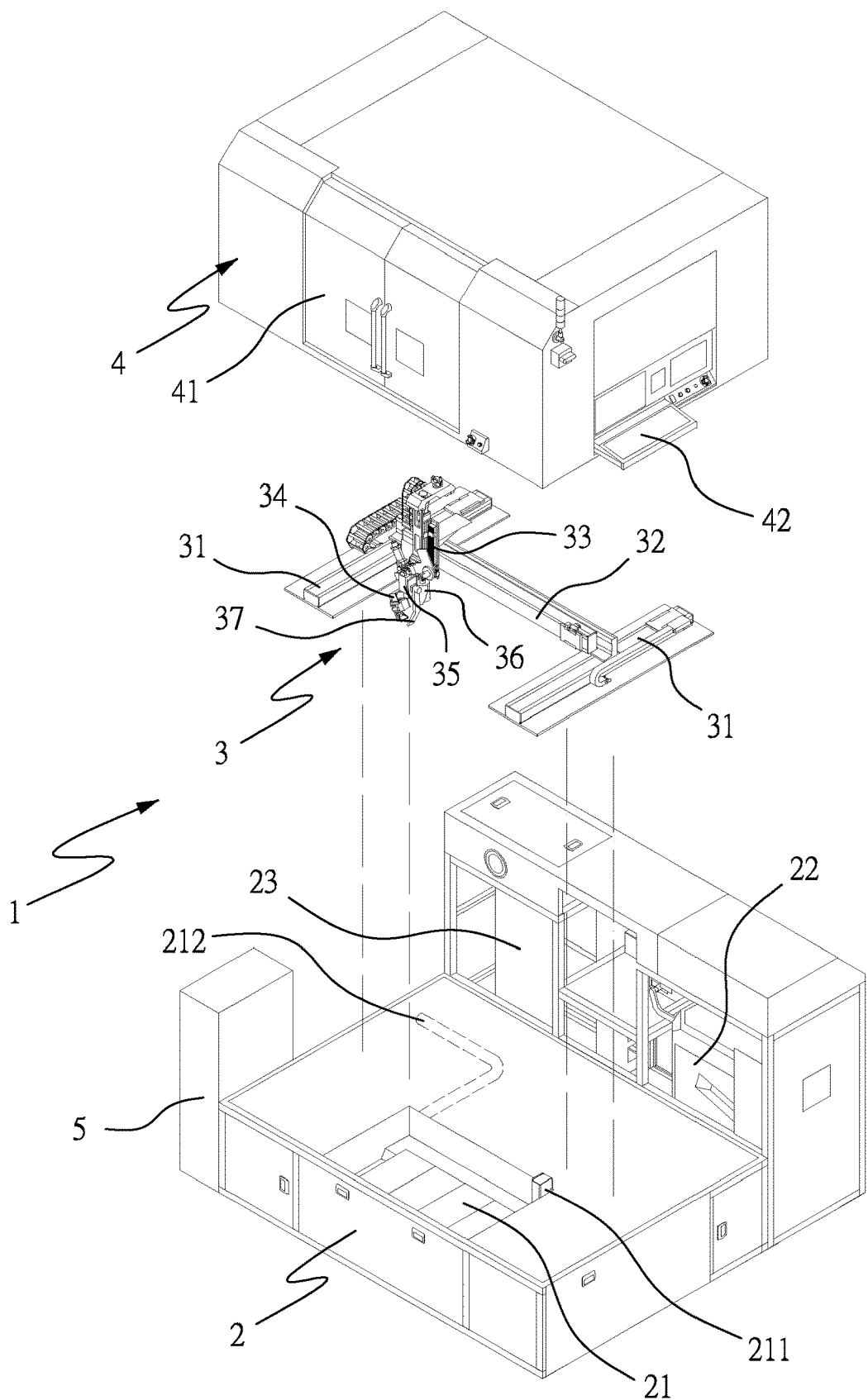
FIG. 2 is a pictorially exploded view showing this invention
Figure 3:
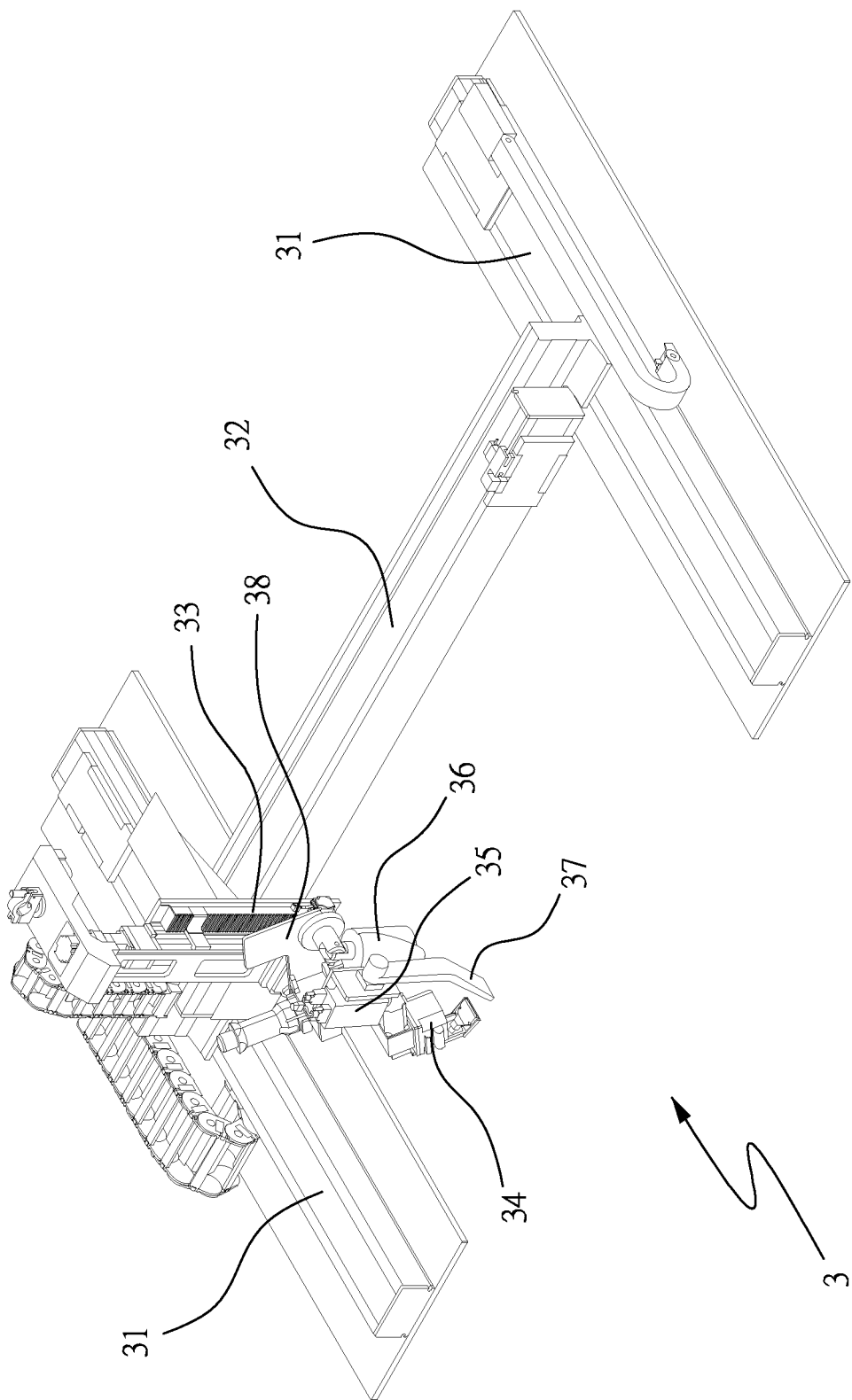
FIG. 3 is a first partial schematic view showing this invention.
Figure 4:
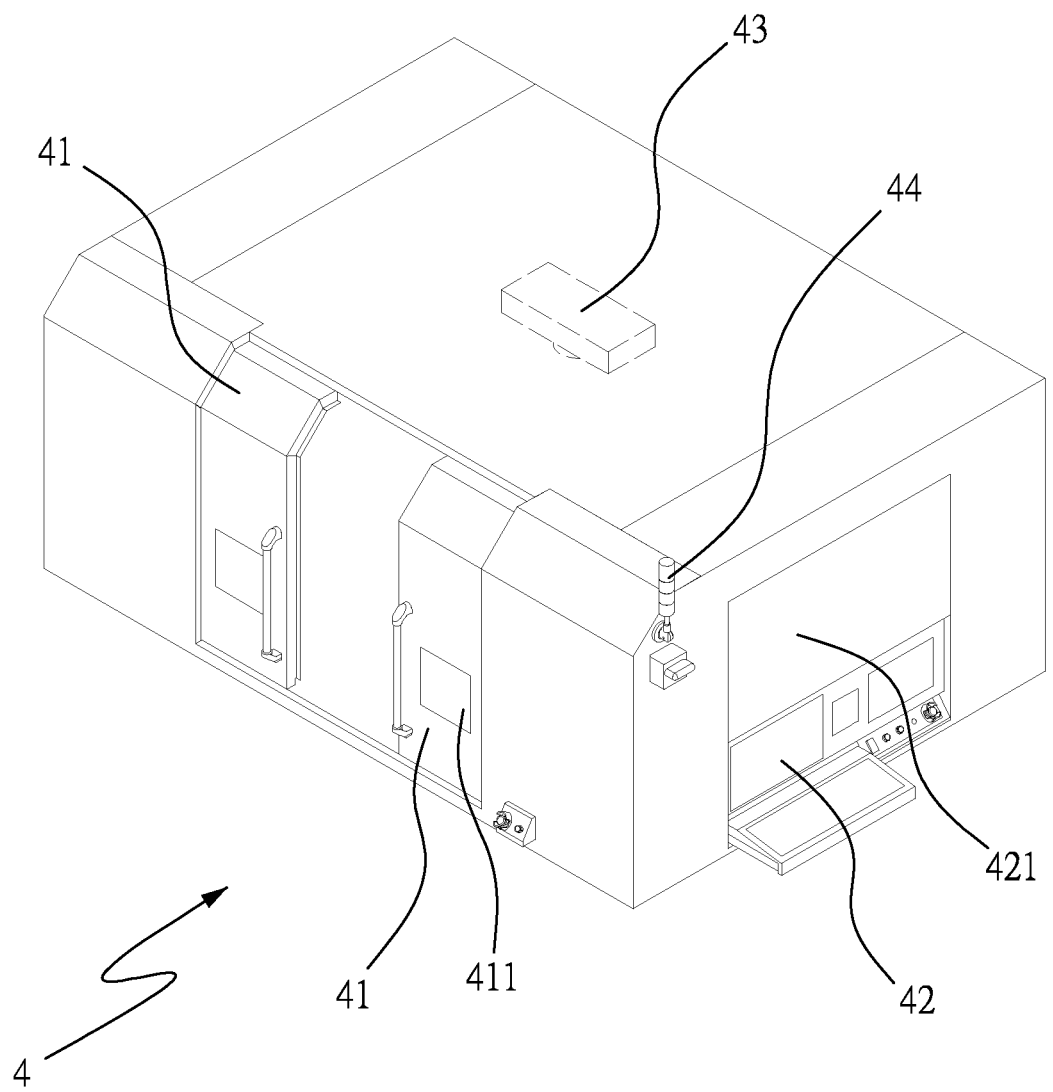
FIG. 4 is a second partial schematic view showing this invention.
Figure 5:
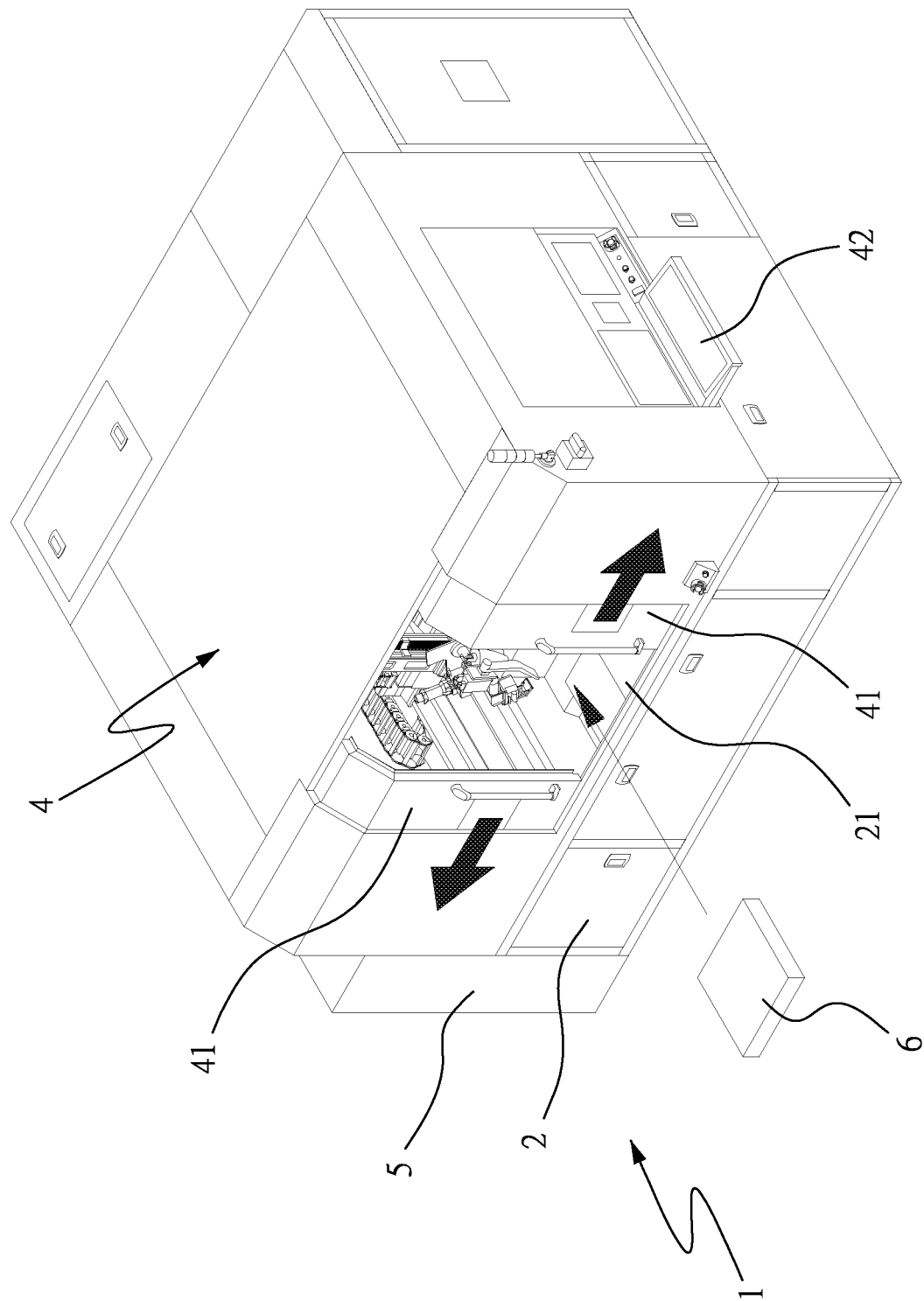
FIG. 5 is a first schematic view showing a preferred embodiment of this invention.
Figure 6:
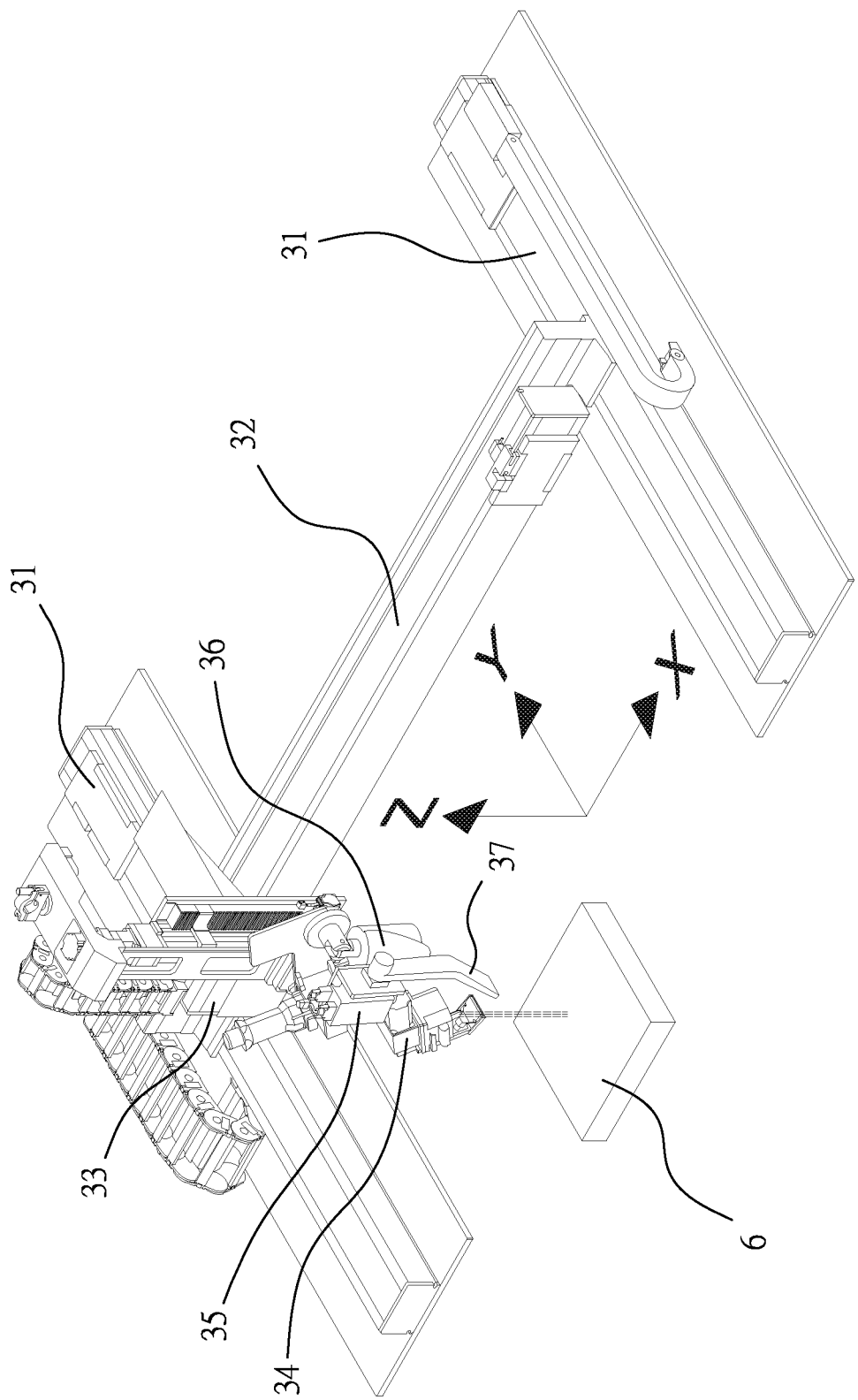
FIG. 6 is a second schematic view showing the preferred embodiment of this invention.

FIGS. 1 to 6 are a pictorial outlook view, a pictorially exploded view, partial schematic views and schematic views showing a preferred embodiment of this invention. Referring to FIGS. 1 to 6, this invention provides a wet laser cleaning apparatus 1 mainly including a machine base 2, a laser cleaning module 3, a shielding housing 4 and a filtering device 5.

The machine base 2 is provided with a reservoir 21, and additionally provided with an optical fiber laser knife module 22 and a power supply module 23.

The laser cleaning module 3 is disposed on a circumference of the reservoir 21 of the machine base 2. The laser cleaning module 3 is composed of two first parallel axial track groups 31, a second parallel axial track group 32, a vertical axial track group 33, an optical fiber laser knife device 34, a height sensor device 35, an image acquiring device 36 and an air knife device 37.

The shielding housing 4 covers the reservoir 21 of the machine base. Two protection sliding doors 41 and a control module 42 are disposed on an outer side of the shielding housing 4. An orientation sensor device 43 is disposed above an inner side of the shielding housing 4.

The filtering device 5 is disposed on one side of the machine base 2, connected to the reservoir 21 of the machine base 2 and for supplying and filtering a liquid (e.g., water) required by the reservoir 21.

A liquid level detector 211 is additionally disposed in the reservoir 21 of the machine base 2.

The reservoir 21 of the machine base 2 is connected with a supply pipeline 212, through which the liquid is introduced into the reservoir 21.

The vertical axial track group 33 is disposed on the second parallel axial track group 32, and the second parallel axial track group 32 is disposed across the two first parallel axial track groups 31.

The optical fiber laser knife device 34, the height sensor device 35 and the image acquiring device 36 are disposed on the vertical axial track group 33 through a fine tuning mechanism 38.

The first parallel axial track groups 31 can perform front-rear reciprocating in a Y-axis direction.

The second parallel axial track group 32 can perform left-right reciprocating in an X-axis direction.

The vertical axial track group 33 can perform up-down reciprocating in a Z-axis direction.

At least one observation window 411 is disposed on one or each of the protection sliding doors 41.

The control module 42 further includes an image display device 421.

An alarm device 44 is additionally disposed on the shielding housing 4.

When the wet laser cleaning apparatus 1 of this invention is used, the protection sliding doors 41 of the shielding housing 4 are opened firstly so that a base material 6 can be placed into the reservoir 21 of the machine base 2. Then, the protection sliding doors 41 are closed, and the control module 42 drives the laser cleaning module 3 in the shielding housing 4 so that the optical fiber laser knife device 34 of the laser cleaning module 3 cleans the base material 6.

As mentioned hereinabove, after the base material 6 has been placed into the reservoir 21 of the machine base 2, the orientation sensor device 43 firstly senses the position of the base material 6, and then the height sensor device 35 senses the height of the base material 6. The information of the sensed and collected position and height will be transmitted to the control module 42. After the control module 42 has obtained the information of the position and the height of the base material 6, the control module 42 firstly controls the supply pipeline 212 to introduce the liquid into the reservoir 21 with the base material 6 being fully immersed into the liquid. Finally, the control module 42 performs calculations and then drives the first parallel axial track groups 31, the second parallel axial track group 32 and the vertical axial track group 33 to move the optical fiber laser knife device 34 to clean the surface of the base material 6.

The first parallel axial track groups 31 move the second parallel axial track group 32, the second parallel axial track group 32 moves the vertical axial track group 33, and the vertical axial track group 33 moves the optical fiber laser knife device 34 thereon. Because the first parallel axial track groups 31 can move in the Y-axis direction, the second parallel axial track group 32 can move in the X-axis direction, and the vertical axial track group 33 can move in the Z-axis direction, the optical fiber laser knife device 34 can be moved to reciprocate in the front, rear, left, right, up and down directions.

In addition, the optical fiber laser knife device 34, the height sensor device 35 and the image acquiring device 36 are disposed on the vertical axial track group 33 through the fine tuning mechanism 38, and are mainly for the purpose that the angles of the optical fiber laser knife device 34, the height sensor device 35 and the image acquiring device 36 can be finely adjusted through the fine tuning mechanism 38.

In addition, when the control module 42 performs the calculation according to the information of the position and the height of the base material 6 sensed and collected by the orientation sensor device 43 and the height sensor device 35, the dimensional size and the shape of the base material 6 can be further determined. So, the irradiating distance and path of the optical fiber laser knife device 34 on the base material 6 can be accurately controlled to achieve the optimum cleaning efficiency.

In addition, the control module 42 can control the optical fiber laser knife module 22 to drive the optical fiber laser knife device 34 to perform irradiating, the irradiating frequency and range of the optical fiber laser knife device 34 can be adjusted through the optical fiber laser knife module 22.

In addition, the image acquiring device 36 additionally disposed on the vertical axial track group 33 is mainly used to continuously photograph the cleaning process, and the cleaning process can be displayed through the image display device 421 of the control module 42 so that the operator can monitor the cleaning condition at any time.

In addition to controlling of the laser cleaning module 3 to perform the cleaning operation, the control module 42 can further monitor and detect the temperature and smog conditions in the cleaning operation, and the temperature and smog conditions can be displayed through the image display device 421 of the control module 42 at the same time.

In addition, the toxic substances and heavy metal dusts are produced in the process of cleaning the base material 6, and the base material 6 is further immersed into the liquid, all dusts are stored in the liquid. After the base material 6 has been cleaned, the liquid in the reservoir 21 is discharged through and filtered by the filtering device 5 to prevent the operator from contacting the toxic substances and the dusts after the operator opens the protection sliding doors 41. Furthermore, sparks will be produced in the process of cleaning the base material 6, and the liquid immersion prevents the sparks from being produced to achieve the effective protection objective. After the liquid has been completely discharged, a new base material 6 may be placed, and then a new liquid is introduced into the reservoir 21.

In addition, this invention adopts the optical fiber laser knife module 22 mainly for the following purposes. Because the optical fiber laser knife module 22 does not have the components of the laser resonant cavity, the tedious processes of replacing and calibrating the laser resonant cavity can be avoided, and the optical fiber laser knife module 22 further has the advantages of resisting the vibration, saving the power, lengthening the service life, increasing the light conversion rate, decreasing the transmission loss and lowing the maintenance cost.

In addition, some of the toxic substances and the heavy metal dusts produced in the process of cleaning the base material 6 may float on the surface of the liquid to affect the irradiation efficiency of the optical fiber laser knife device 34. At this time, the air knife device 37 continuously blows away the toxic substances and the dusts, floating on the surface of the liquid within the irradiation range, so that the optical fiber laser knife device 34 is kept at the optimum irradiation efficiency.

In addition, the alarm device 44 additionally disposed on the shielding housing 4 is mainly for the purpose of providing the alarm in the form of light or audio warming message through the alarm device 44 to notify the operator when the wet laser cleaning apparatus 1 has the abnormal condition.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A wet laser cleaning apparatus, comprising:
    a machine base provided with a reservoir, and additionally provided with an optical fiber laser knife module and a power supply module;
    a laser cleaning module, which is disposed on a circumference of the reservoir of the machine base, and composed of two first parallel axial track groups, a second parallel axial track group, a vertical axial track group, an optical fiber laser knife device, a height sensor device, an image acquiring device and an air knife device;
    a shielding housing for covering the reservoir of the machine base, wherein two protection sliding doors and a control module are disposed on an outer side of the shielding housing, and an orientation sensor device is disposed on an inner side of the shielding housing; and a filtering device, which is disposed on one side of the machine base, connected to the reservoir of the machine base, and for supplying and filtering a liquid required by the reservoir.

2. The wet laser cleaning apparatus according to claim 1, wherein a liquid level detector is additionally disposed in the reservoir of the machine base.

3. The wet laser cleaning apparatus according to claim 1, wherein the reservoir of the machine base is connected with a supply pipeline, through which the liquid is introduced into the reservoir.

4. The wet laser cleaning apparatus according to claim 1, wherein the vertical axial track group is disposed on the second parallel axial track group, and the second parallel axial track group is disposed across the two first parallel axial track groups.

5. The wet laser cleaning apparatus according to claim 1, wherein the optical fiber laser knife device, the height sensor device, the image acquiring device and the air knife device are disposed on the vertical axial track group through a fine tuning mechanism.

6. The wet laser cleaning apparatus according to claim 1, wherein the first parallel axial track groups can perform front-rear reciprocating in a Y-axis direction.

7. The wet laser cleaning apparatus according to claim 1, wherein the second parallel axial track group can perform left-right reciprocating in an X-axis direction.

8. The wet laser cleaning apparatus according to claim 1, wherein the vertical axial track group can perform up-down reciprocating in a Z-axis direction.

9. The wet laser cleaning apparatus according to claim 1, wherein at least one observation window is disposed on one or each of the protection sliding doors.

10. The wet laser cleaning apparatus according to claim 1, wherein the control module comprises an image display device.

11. The wet laser cleaning apparatus according to claim 1, wherein an alarm device is additionally disposed on the shielding housing.

* * * * *